US006966729B2

United States Patent
Dehn et al.

(10) Patent No.: US 6,966,729 B2
(45) Date of Patent: Nov. 22, 2005

(54) TANGENTIAL REVERSIBLE CUTTING BLADE

(75) Inventors: Gerhard Dehn, Molln (DE); Achim Engfer, Lubeck (DE); Uwe Schunk, Lubeck (DE); Gerhard Zawidzki, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 252 days.

(21) Appl. No.: 10/615,355

(22) Filed: Jul. 8, 2003

(65) Prior Publication Data

US 2004/0013478 A1 Jan. 22, 2004

(30) Foreign Application Priority Data

Jul. 11, 2002 (DE) .......................................... 102 31 339

(51) Int. Cl.⁷ ................................................. B23C 5/20
(52) U.S. Cl. ........................ 407/113; 407/116; 407/114
(58) Field of Search ................................ 407/113, 114, 407/115, 116, 103

(56) References Cited

U.S. PATENT DOCUMENTS

| 3,142,110 A | * | 7/1964 | Hertel | 407/114 |
| 3,490,117 A | * | 1/1970 | Hertel | 407/104 |
| 4,074,949 A | * | 2/1978 | Hochmuth et al. | 407/114 |
| 4,294,566 A | * | 10/1981 | Boone | 407/114 |
| 5,853,267 A | * | 12/1998 | Satran et al. | 407/113 |

FOREIGN PATENT DOCUMENTS

| DE | 197 04 931 | 3/1998 |
| DE | 299 12 025 | 9/1999 |
| EP | 0 769 341 A1 | 10/1996 |

* cited by examiner

Primary Examiner—Willmon Fridie, Jr.
(74) Attorney, Agent, or Firm—Vidas, Arrett & Steinkraus, P.A.

(57) ABSTRACT

A tangential reversible cutting blade, comprising:

a prismatic body which is bordered by two opposed, identically shaped first surfaces and four identically shaped, interposed lateral surfaces, four equal-length main cutting edges on each of the first surface which are defined with one lateral face each, a raised web on each lateral surface with the four webs being symmetrical with a central plane through the lateral surfaces, a through mounting bore coaxial with the axis through the centres of the first surfaces, metal-cutting faces on the lateral surfaces which are defined by fillets adjacent to the main cutting edges on either side of the associated web, and cutting-tool flanks on the first surfaces which are defined by a spherical surface shape of the first surfaces adjacent to the main cutting edges.

10 Claims, 3 Drawing Sheets

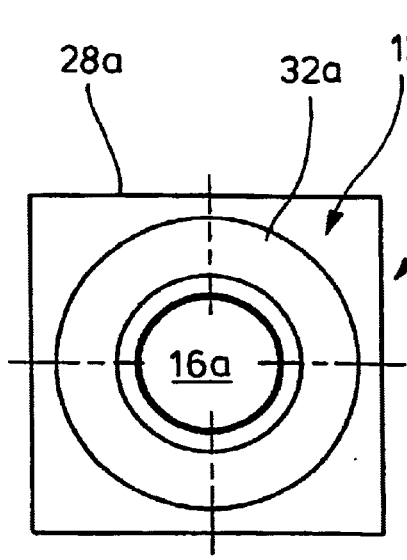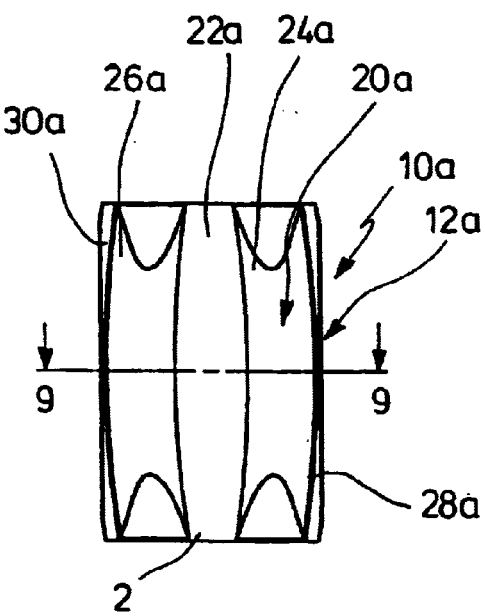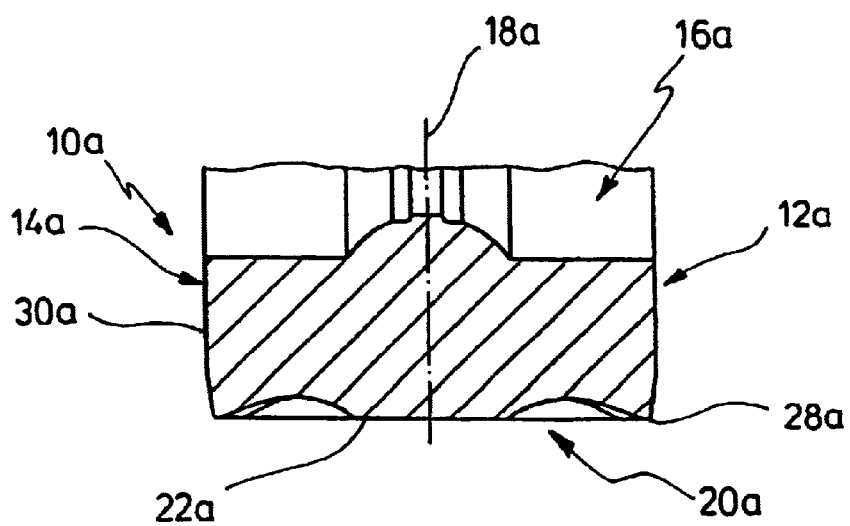

TANGENTIAL REVERSIBLE CUTTING BLADE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

DE 197 04 931 C1 has made known a reversible cutting blade having a substantially cubic basic body which is provided with eight utilizable cutting edges. It has two larger surfaces which are disposed in parallel with each other and are traversed by a mounting hole and four lateral surfaces each adjacent thereto with the larger surfaces passing over to terminate in the smaller end surfaces via a rounded edge so that cutting edges formed in an approximately quadrant shape result on the longitudinal side as limiting lines to the end surfaces in the corner area. The longer cutting edges are arcuately curved as limiting lines between the larger surfaces and each longitudinal surface adjacent thereto so that this results in a body which is specularly symmetrical with the longitudinal central and transverse central planes. Reversible cutting blades of this type are tangentially mounted on a milling cutter.

EP 0 769 341 A1 has made known a reversible cutting blade in which one cutting edge is formed towards each covering and base surface in the area of its two lateral surfaces and in the area of its two end surfaces. All of the cutting edges adjoining the lateral surfaces and end surfaces are of the same cutting geometry. Chip-collecting troughs are worked each into the covering and base surfaces and along the two lateral surfaces and along the two end surfaces. The long cutting edges exhibit an arcuately ground contour.

DE 299 12 025 has made known a tangential cutting insert having an efficient front surface, upper and lower main cutting edges, secondary lateral cutting edges and interposed corner-cutting edges. They exhibit metal-cutting surfaces formed on their front surface which extend in an inward direction from their associated cutting edges with regard to the cutting insert with the cutting insert having an imaginary reference plane which runs through final points of its corner cutting edges. Each main cutting edge extends inwardly from its associated corner edges with regard to the insert and away from the reference plane.

It is the object of the invention to provide a tangential reversible cutting blade which can be used eight times.

BRIEF SUMMARY OF THE INVENTION

The inventive tangential reversible cutting blade has a prismatic body which is bordered by two opposed, identically shaped first surfaces and four identically shaped, interposed lateral surfaces. Each first surface forms four equal-length main cutting edges with the lateral surfaces. All main cutting edges are of an identical geometry. Furthermore, the inventive reversible cutting blade has a raised web with a planar surface with the four webs being arranged symmetrically with a central plane which runs through the lateral surfaces. When the inventive reversible cutting blade is clamped by means of a locking screw passing trough a central through bore one seating area of the first surface will bear on a seating surface of the milling cutter whereas at least one web bears on another seating area by its surface. Thus, one main cutting edge each may be employed when the inventive reversible cutting blade is turned through 90° each. When the inventive reversible cutting blade is turned through 180° a rest will then be achieved on the other first surface so that rotations through 90° again will allow to employ an associated cutting edge each.

The metal-cutting faces for the main cutting edges are formed in the lateral surfaces by respective fillets on either side of the web. The cutting-tool flanks are formed on the first surfaces in the shape of spherical surface portions which are adjacent to the main cutting edges.

Eight equivalent cutting edges are obtained in the inventive tangential reversible cutting blade. The blade is equally usable for steel and cast material. It can be readily manufactured with a positive face angle.

As was mentioned the first surfaces which oppose each other are of a spherical shape. According to an aspect of the invention, the annular area portions of the first surfaces that adjoin the through mounting bore are plane-parallel. In this area, the reversible cutting blade is caused to bear on the seating area into which the reception bore is formed to fix the screw.

According to an aspect of the invention, the secondary cutting edges or wiper edges are formed by recesses of the corner areas between the lateral surfaces and a plane chamfer at the end of the main cutting edges. According to another aspect of the invention, the plane chamfer is bulged in a convex fashion, i.e. is provided with a radius. Such a plane chamfer, which runs away rearwards, permits a soft penetration into the material. The curved cutting edge, which results from the surface shapes of the first two areas, also allows to make a soft cut.

BRIEF DESCRIPTION OF THE SEVERAL VIEWS OF THE DRAWINGS

The invention will be explained in more detail below with reference to an embodiment.

FIG. 7 shows a side view of the reversible cutting blade of FIG. 6.

FIG. 8 shows a plan view of the reversible cutting blade of FIG. 6.

FIG. 9 shows an enlarged section through the reversible cutting blade of FIG. 7 along line 9—9.

DETAILED DESCRIPTION OF THE INVENTION

Figure 1:
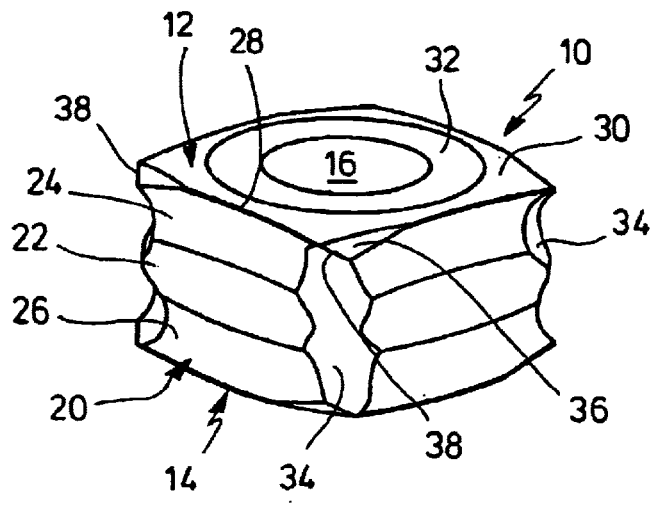
FIG. 1 shows a perspective view of a tangential reversible cutting blade according to the invention.

While this invention may be embodied in many different forms, there are described in detail herein a specific preferred embodiment of the invention. This description is an exemplification of the principles of the invention and is not intended to limit the invention to the particular embodiment illustrated.

FIGS. 1 through 4 illustrate a tangential reversible cutting blade. It has opposed first surfaces 12, 14 which are broken through by a through bore 16. As is apparent from FIG. 4 the through bore 16 is symmetrical with a central plane 18 which runs approximately in parallel with the lateral surfaces 12, 14. Four lateral surfaces 20 which are offset by approximately 90° are located between the first surfaces 12, 14. The lateral surfaces 20 are defined by a central raised web 22 and fillets 24, 26 on either side of the web. Main cutting edges 28 are formed between the fillets 24, 26 and the associated first surface 12 and 14, respectively. As can be seen from FIGS. 1 and 2 the main cutting edges 28 are straight as seen in a plane view of the first surfaces 12, 14, but are arcuately curved as seen in a side view. This curvature results from the fact that the first surfaces 12, 14 define spherical surface portions 30 in the area adjacent to the main cutting edges 28. The through bore 16 is encircled by a planar annular surface portion 32 on either first surface 12, 14 with the annular surface portions 32 of the two first surfaces 12, 14 are plane-parallel to each other.

Figure 2:
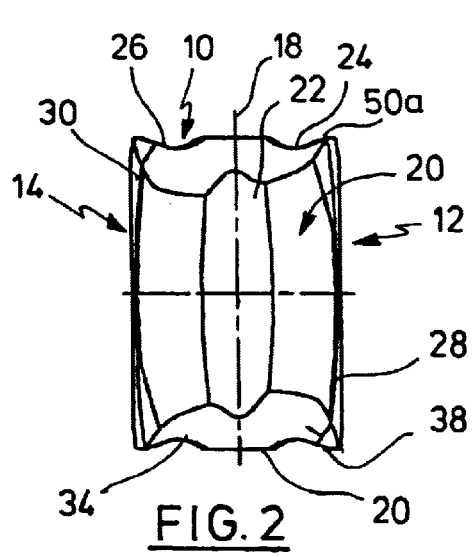
FIG. 2 shows a side view of the reversible cutting blade of FIG. 1.
Figure 3:
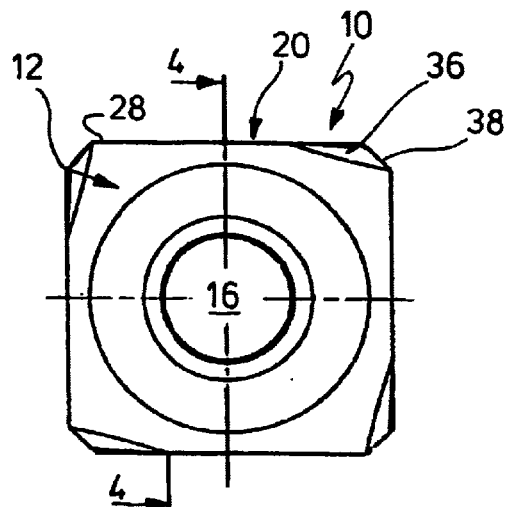
FIG. 3 shows a plan view of the reversible cutting blade of FIG. 1.
Figure 4:
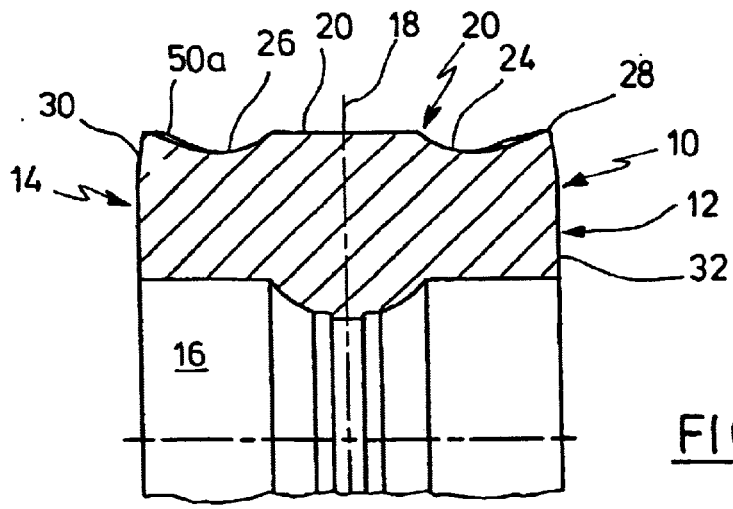
FIG. 4 shows an enlarged section through the reversible cutting blade of FIG. 3 along line 4—4.

As ensues from FIGS. 2 to 4 the webs 22 which exhibit a plane surface are symmetrical with the central plane 18. This also holds true for the fillets 20 on either side of the web 22.

The corner areas of the lateral surfaces 20 have formed therein fillets 34 which form secondary cutting edges or wiper edges 38 with the plane chamfers 36 at the ends of the cutting edges 28. The plane chamfers 36 may be provided with a radius, i.e. exhibit a convex bulge.

As can be recognized the reversible cutting blade 10 shown is adapted to be employed in eight different positions where a main cutting edge 28 and a secondary edge 38 each find their application.

Figure 5:
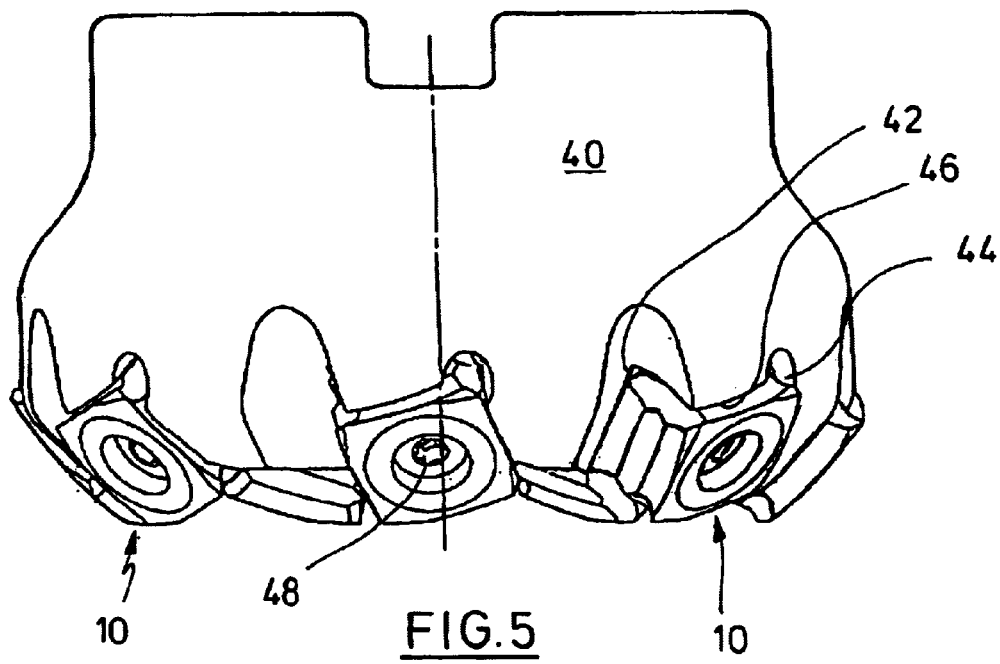
FIG. 5 shows a milling cutter having a plurality of reversible cutting blades according to the invention.
Figure 6:
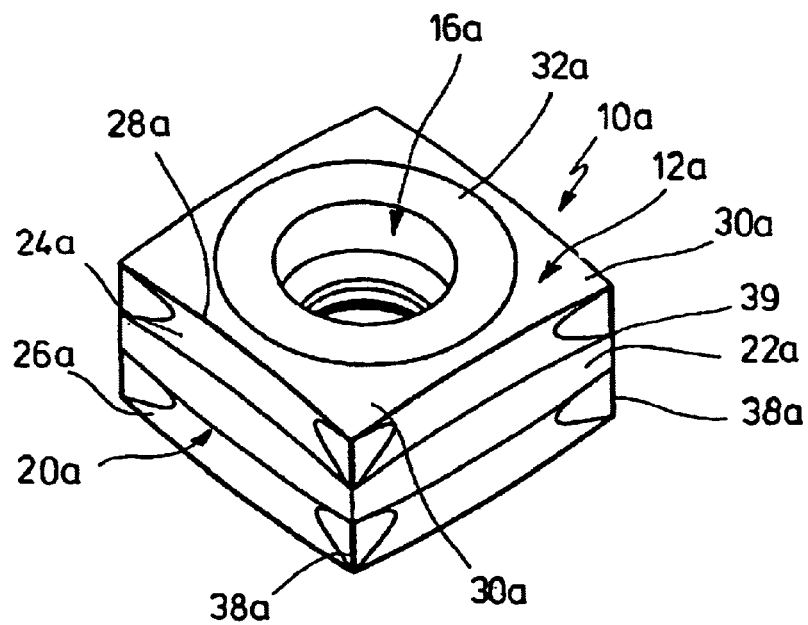
FIG. 6 shows a perspective view of another embodiment of a tangential reversible cutting blade according to the invention.

One possible application is illustrated in FIG. 5 in which a plurality of reversible cutting blades 10 are mounted on a carrier body 40. The carrier body has pocket-shaped receptacles for the reversible cutting blades 10 that form a first seating area 42 and a second seating area 44. One annular area portion 32 each of the first surfaces 12, 14 comes to bear on the seating area 42. One web each comes to bear by its plane surface 22 on the second seating area 44. A third seating area 46 permits a second web of the reversible cutting blade to bear there. It is fastened there by means of screw 48 which is passed through the through bore 16 of the reversible cutting blade 10 and is screwed into a threaded bore (not shown) in the seating area 42.

The axis of rotation of the milling cutter is illustrated at 50. In the representation shown, the milling cutter 50 rotates in a clockwise sense. The reversible cutting blades 10 are mounted in a tangential order and are arranged at angles of 45°. The latter is not a condition, however. The setting angle κ may be chosen at random within certain limits.

The fillets 24, 26 can be seen to define metal-cutting faces 50a. The cutting-tool flanks are defined by the spherical surface shape portions 30. The cutting-tool flanks for the wiper edges 38 are formed by the plane chamfers 36. Moreover, the fillets 24, 26 are not straight, but are provided with a radius so as to be of a concave shape longitudinally, i.e. to have their deepest point in the middle and flatten out slightly towards the ends.

FIGS. 6 through 9 illustrate a tangential reversible cutting blade. It has opposed first surfaces 12a, 14a which are broken through by a through bore 16a. As is apparent from FIG. 8 the through bore 16a is symmetrical with a central plane 18a which runs approximately in parallel with the lateral surfaces 12a, 14a. Four lateral surfaces 20a which are offset by approximately 90° are located between the first surfaces 12a, 14a. The lateral surfaces 20a are defined by a central raised web 22a and fillets 24a, 26a on either side of the web. Main cutting edges 28a are formed between the fillets 24a, 26a and the associated first surface 12a and 14a, respectively. As can be seen from FIGS. 1 and 2 the main cutting edges 28a are straight as seen in a plane view of the first surfaces 12a, 14a, but are arcuately curved as seen in a side view. This curvature results from the fact that the first surfaces 12a, 14a define spherical surface portions 30a in the area adjacent to the main cutting edges 28a. The through bore 16a is encircled by a planar annular surface portion 32a on either first surface 12a, 14a with the annular surface portions 32a of the two first surfaces 12a, 14a are plane-parallel to each other.

As ensues from FIGS. 7 to 9 the webs 22a which exhibit a plane surface are symmetrical with the central plane 18a. This also holds true for the fillets 20a on either side of the web 22a. The fillets 20a enter the edge 39 via surface portions 27. The surface portions 27 are shown to be plane, but need not be so.

As can be recognized the reversible cutting blade 10a shown is adapted to be employed in eight different positions where a main cutting edge 28a and a secondary edge 38a each find their application.

One possible application is illustrated as being similar to FIG. 5 in which a plurality of reversible cutting blades 10a are mounted on a carrier body. However, the plates 10a for the tangential milling head are used in a 90° arrangement whereas the embodiment of FIGS. 1 through 5 provides for a 45° arrangement. The carrier body has pocket-shaped receptacles for the reversible cutting blades 10a that form a first seating area and a second seating area. One annular area portion 32a each of the first surfaces 12a, 14a comes to bear on the first seating area. One web 22a each comes to bear by its plane surface on the second seating area. A third seating area permits a second web of the reversible cutting blade to bear there. It is fastened there by means of screw which is passed through the through bore 16a of the reversible cutting blade 10a and is screwed into a threaded bore (not shown) in the first seating area.

The reversible cutting blade may be employed for either sense of rotation of the milling cutter. The setting angle κ may be chosen at random within certain limits.

The fillets 24a, 26a can be seen to define metal-cutting faces. The cutting-tool flanks are defined by the spherical surface shape portions 30a. The cutting-tool flanks for the wiper edges 38a are formed by the plane chamfers. What can be seen is that substantially straight edges 39 are provided at the corners of the cutting blade 10a which are located approximately perpendicularly to the plane of the areas 32a and the portions of which that lie towards the corners define the wiper edges 38a. The fillets 24a, 26a are not straight longitudinally, but are provided with a radius so as to be of a concave shape longitudinally, i.e. to have their deepest point in the middle and flatten out slightly towards the ends.

The above Examples and disclosure are intended to be illustrative and not exhaustive. These examples and description will suggest many variations and alternatives to one of ordinary skill in this art. All these alternative and variations are intended to be included within the scope of the attached claims. Those familiar with the art may recognize other equivalents to the specific embodiments described herein which equivalents are also intended to be encompassed by the claims attached hereto.

What is claimed is:

1. A tangential reversible cutting blade, comprising:
   a prismatic body which is bordered by two opposed, identically shaped first surfaces (12, 14) and four identically shaped, interposed lateral surfaces (20),
   four equal-length main cutting edges (28) on each of the first surface (12, 14) which are defined with one lateral face (20) each,
   a raised web (22) on each lateral surface (20) with the four webs being symmetrical with a central plane (18) through the lateral surfaces (20),
   a through mounting bore (16) coaxial with the axis through the centres of the first surfaces (12, 14),
   metal-cutting faces on the lateral surfaces (20) which are defined by fillets (24, 26) adjacent to the main cutting edges (28) on either side of the associated web (22), and
   cutting-tool flanks on the first surfaces (12, 14) which are defined by a spherical surface shape (30) of the first surfaces (12, 14) adjacent to the main cutting edges (28).

2. The reversible cutting blade as claimed in claim 1, characterized in that annular area portions (32) of the first surfaces (12, 14) that adjoin the through mounting bore (16) are plane-parallel.

3. The reversible cutting blade as claimed in claim 1, characterized in that secondary cutting edges or wiper edges (38) are formed by recesses (34) of the corner areas between the lateral surfaces (20) and plane chamfers (36) at the end of the main cutting edges (28).

4. The reversible cutting blade as claimed in claim 3, characterized in that the plane chamfer (36) is bulged in a convex fashion.

5. The reversible cutting blade as claimed in claim 1, characterized in that the fillet (24, 26) is of a concave shape longitudinally.

6. A tangential reversible cutting blade, comprising:
   a prismatic body which is bordered by two opposed, identically shaped first surfaces (12a, 14a) and four identically shaped, interposed lateral surfaces (20a),
   four equal-length main cutting edges (28a) on each of the first surface (12a, 14a) which are defined with one lateral face (20a) each,
   a raised web (22a) on each lateral surface (20a) with the four webs being symmetrical with a central plane (18a) through the lateral surfaces (20a),
   a through mounting bore (16a) coaxial with the axis through the centres of the first surfaces (12a, 14a),
   metal-cutting faces on the lateral surfaces (20a) which are defined by fillets (24a, 26a) adjacent to the main cutting edges (28a) on either side of the associated web (22a), and
   cutting-tool flanks on the first surfaces (12a, 14a) which are defined by a spherical surface shape (30a) of the first surfaces (12a, 14a) adjacent to the main cutting edges (28a).

7. The reversible cutting blade as claimed in claim 6, characterized in that annular area portions (32a) of the first surfaces (12a, 14a) that adjoin the through mounting bore (16a) are plane-parallel.

8. The reversible cutting blade as claimed in claim 6, characterized in that secondary cutting edges or wiper edges (38a) are formed by recesses (34a) of the corner areas between the lateral surfaces (20a) and plane chamfers (36a) at the end of the main cutting edges (28a).

9. The reversible cutting blade as claimed in claim 8, characterized in that the plane chamfer (36a) is bulged in a convex fashion.

10. The reversible cutting blade as claimed in claim 6, characterized in that the fillet (24a, 26a) is of a concave shape longitudinally.

* * * * *